(12) United States Patent
Bai et al.

(10) Patent No.: US 12,445,990 B2
(45) Date of Patent: Oct. 14, 2025

(54) MACHINE LEARNING BASED TIMING ADVANCE UPDATES

(71) Applicant: QUALCOMM Incorporated, San Diego, CA (US)

(72) Inventors: Tianyang Bai, Somerville, NJ (US); Hua Wang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/048,728

(22) Filed: Oct. 21, 2022

(65) Prior Publication Data
US 2024/0137884 A1  Apr. 25, 2024
US 2024/0236894 A9  Jul. 11, 2024

(51) Int. Cl.
*H04W 56/00* (2009.01)
*H04W 24/08* (2009.01)

(52) U.S. Cl.
CPC ....... *H04W 56/0045* (2013.01); *H04W 24/08* (2013.01)

(58) Field of Classification Search
CPC . H04W 56/0045; H04W 24/08; H04W 24/02; H04W 24/10
See application file for complete search history.

(56) References Cited

U.S. PATENT DOCUMENTS

| | | | |
|---|---|---|---|
| 10,986,663 B2 * | 4/2021 | Yi | H04W 74/02 |
| 11,388,690 B1 | 7/2022 | Bai et al. | |
| 2018/0160440 A1 * | 6/2018 | Hosseini | H04W 72/23 |
| 2020/0229125 A1 * | 7/2020 | Manolakos | H04L 5/0048 |
| 2021/0045075 A1 * | 2/2021 | Manolakos | H04W 24/08 |
| 2022/0312357 A1 | 9/2022 | Prasad et al. | |

(Continued)

FOREIGN PATENT DOCUMENTS

| | | | | |
|---|---|---|---|---|
| EP | 3962153 A1 * | 3/2022 | | H04W 24/10 |
| WO | WO-2022005355 A1 * | 1/2022 | | H04B 17/3913 |

(Continued)

OTHER PUBLICATIONS

International Search Report and Written Opinion—PCT/US2023/075240—ISA/EPO—Feb. 2, 2024

*Primary Examiner* — Mong-Thuy T Tran
(74) *Attorney, Agent, or Firm* — Holland & Hart LLP/Qualcomm

(57) ABSTRACT

Methods, systems, and devices for wireless communications at a user equipment (UE) are described. A UE may identify one or more measurement parameters to use for input in a machine learning (ML) model. In some cases, the measurement parameters may include reference signal received power measurements or a past set of timing advance (TA) values for a specific node. The UE may predict the TA based on inputting the measurement parameters into the ML model. The UE may transmit an uplink communication from the UE to a network entity using the TA predicted from the ML model. In some examples, the UE may transmit a capability report to indicate that the UE may support autonomous update of the TA based on the predictions of the TA values produced from the ML model.

28 Claims, 11 Drawing Sheets

(56) References Cited

U.S. PATENT DOCUMENTS

| | | | |
|---|---|---|---|
| 2023/0115368 A1* | 4/2023 | Parichehrehteroujeni | ............... H04W 12/60 706/46 |
| 2023/0126659 A1* | 4/2023 | Petrov | ............ H04W 56/001 370/336 |
| 2023/0327790 A1* | 10/2023 | Da Silva | ............ H04B 17/3913 455/67.11 |
| 2024/0243984 A1* | 7/2024 | Soldati | ............ H04L 43/08 |
| 2024/0244499 A1* | 7/2024 | Ramachandra | ......... H04W 8/08 |

FOREIGN PATENT DOCUMENTS

| | | | | |
|---|---|---|---|---|
| WO | WO-2022210001 A1 * | 10/2022 | ........ | H04W 56/0045 |
| WO | WO-2023018943 A1 | 2/2023 | | |
| WO | WO-2024072313 A1 * | 4/2024 | ........... | H04L 1/0026 |

* cited by examiner

MACHINE LEARNING BASED TIMING ADVANCE UPDATES

FIELD OF TECHNOLOGY

The following relates to wireless communications, including machine learning (ML) based timing advance updates.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for machine learning (ML) based timing advance (TA) update. For example, the described techniques provide for a user equipment (UE) to identify one or more measurement parameters to input into an ML model. Additionally or alternatively, the UE may receive one or more TA values from the network entity. In some examples, the ML model may predict a TA value for an uplink communication from the UE to the network entity based on the measurement parameters and the received TA values. The UE may transmit an uplink communication based on the predicted TA value from the ML model. In some cases, the UE may transmit a capability report to the network entity indicating the capability of the UE to support autonomous update of the TA. In some wireless communications systems, the capability report includes which TA prediction module type the UE supports, the quantity of TA groups the UE may autonomously update, and the type of input the UE supports for TA prediction.

A method for wireless communication at a UE is described. The method may include identifying one or more measurement parameters for inputting to a ML model, predicting a TA value for an uplink communication from the UE to a network entity based on inputting the one or more measurement parameters to the ML model, and transmitting, to the network entity, the uplink communication in accordance with the predicted TA value.

An apparatus for wireless communication at a UE is described. The apparatus may include a processor, memory coupled with the processor, and instructions stored in the memory. The instructions may be executable by the processor to cause the apparatus to identify one or more measurement parameters for inputting to a ML model, predict a TA value for an uplink communication from the UE to a network entity based on inputting the one or more measurement parameters to the ML model, and transmit, to the network entity, the uplink communication in accordance with the predicted TA value.

Another apparatus for wireless communication at a UE is described. The apparatus may include means for identifying one or more measurement parameters for inputting to a ML model, means for predicting a TA value for an uplink communication from the UE to a network entity based on inputting the one or more measurement parameters to the ML model, and means for transmitting, to the network entity, the uplink communication in accordance with the predicted TA value.

A non-transitory computer-readable medium storing code for wireless communication at a UE is described. The code may include instructions executable by a processor to identify one or more measurement parameters for inputting to a ML model, predict a TA value for an uplink communication from the UE to a network entity based on inputting the one or more measurement parameters to the ML model, and transmit, to the network entity, the uplink communication in accordance with the predicted TA value.

Some examples of the method, apparatuses, and non-transitory computer-readable medium described herein may further include operations, features, means, or instructions for transmitting, to the network entity, a capability report indicating a capability for the UE to support autonomous update of TA based on predicting the TA value.

In some examples of the method, apparatuses, and non-transitory computer-readable medium described herein, the capability report further indicates the capability for the UE to support at least one of a TA group module type, a quantity of TA groups for the autonomous update of TA, a type of input for TA prediction, or a combination thereof.

Some examples of the method, apparatuses, and non-transitory computer-readable medium described herein may further include operations, features, means, or instructions for receiving, from the network entity, an indication of a set of TA values, where the set of TA values may be based on at least one reference signal received power measurement at the UE and training the ML model based on the set of TA values, where predicting the TA value may be based on inputting the one or more measurement parameters to the trained ML model.

In some examples of the method, apparatuses, and non-transitory computer-readable medium described herein, identifying the one or more measurement parameters may include operations, features, means, or instructions for measuring one or more reference signal received power values associated with one or more channel state reference signals, where predicting the TA value may be based on inputting the one or more one or more reference signal received power values to the ML model.

Some examples of the method, apparatuses, and non-transitory computer-readable medium described herein may further include operations, features, means, or instructions for determining that the predicted TA value corresponds to an output port associated with the ML model.

Some examples of the method, apparatuses, and non-transitory computer-readable medium described herein may further include operations, features, means, or instructions for identifying a mapping between a cell identifier and the output port associated with the ML model, where transmitting the uplink communication includes transmitting the uplink communication associated with the cell identifier in accordance with the predicted TA value.

Some examples of the method, apparatuses, and non-transitory computer-readable medium described herein may further include operations, features, means, or instructions for identifying a mapping between a TA group identifier and the output port associated with the ML model, where transmitting the uplink communication includes transmitting the uplink communication associated with the TA group identifier in accordance with the predicted TA value.

Some examples of the method, apparatuses, and non-transitory computer-readable medium described herein may further include operations, features, means, or instructions for receiving, from the network entity, a request to pause predicting a future TA value for a second uplink communication and refraining from predicting the future TA value for the second uplink communication based on receiving the request.

Some examples of the method, apparatuses, and non-transitory computer-readable medium described herein may further include operations, features, means, or instructions for receiving, from the network entity, a request for the one or more measurement parameters inputted to the ML model and transmitting, to the network entity, an indication of the one or more measurement parameters in response to the request.

Some examples of the method, apparatuses, and non-transitory computer-readable medium described herein may further include operations, features, means, or instructions for transmitting, to the network entity, a random access signal or a sounding reference signal or both and receiving, from the network entity, an indication of a second TA value based on transmitting the random access signal or the sounding reference signal or both.

Some examples of the method, apparatuses, and non-transitory computer-readable medium described herein may further include operations, features, means, or instructions for receiving, from the network entity, a request to update the ML model and updating the ML model based on the request, where predicting the TA value may be based on inputting the one or more measurement parameters to the updated ML model.

In some examples of the method, apparatuses, and non-transitory computer-readable medium described herein, transmitting the uplink communication may include operations, features, means, or instructions for transmitting, to the network entity, the uplink communication at a first time instance in accordance with the predicted TA value, where the one or more measurement parameters include a set of TA values corresponding to a set of time instances prior to the first time instance.

In some examples of the method, apparatuses, and non-transitory computer-readable medium described herein, the one or more measurement parameters include at least one TA value associated with a second network entity.

In some examples of the method, apparatuses, and non-transitory computer-readable medium described herein, the one or more measurement parameters include at least one of a reference signal received power, a power delay profile associated with one or more beams, a power delay profile associated with the network entity, a power delay profile associated with one or more transmission and reception points, a TA value for a communication link, a location of the UE, a positioning signaling information associated with radio frequency sensing, the positioning signaling information associated with a camera, the positioning signaling information associated with a radar at the UE, a transmission configuration indicator identifier, or a combination thereof.

DETAILED DESCRIPTION

Figure 1:
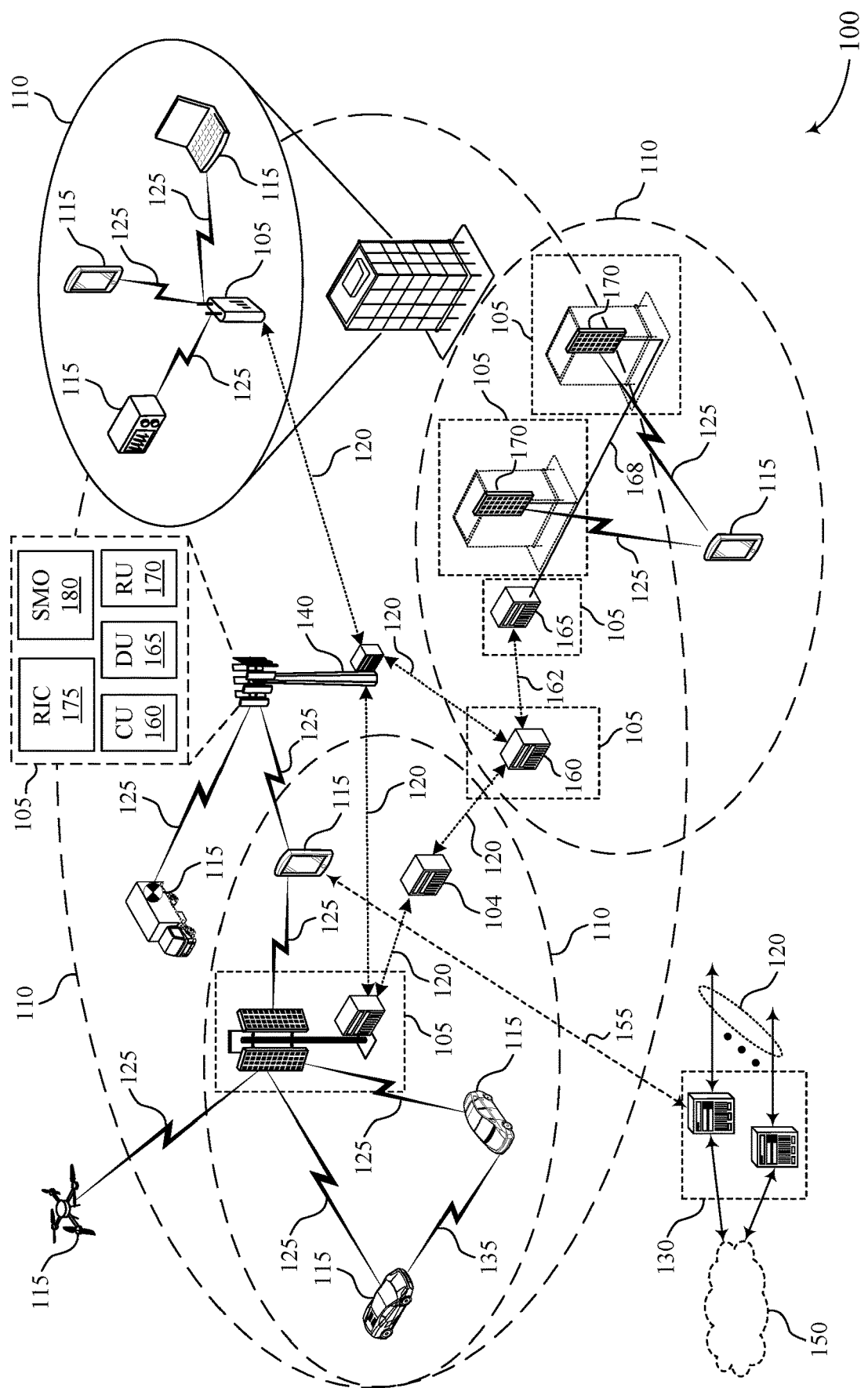
FIG. 1 illustrates an example of a wireless communications system that supports machine learning (ML) based timing advance (TA) updates in accordance with one or more aspects of the present disclosure.

In some wireless communications systems, some network devices (e.g., UEs, network entities) may use a timing advance (TA) to predict a round-trip time. For example, a network entity may use the TA to set expectancies for timed transmissions and schedule transmissions (e.g., future transmissions) with a UE. In some examples, to set the TA for the wireless communications, the network devices may measure the TA with a random access channel (RACH) triggered by a physical downlink control channel (PDCCH) order or through one or more reference signals (RSs) (e.g., sounding reference signals (SRSs) and tracking reference signals (TRSs)). In some cases, the network entity may measure the TA value associated with SRS or RACH and may transmit an indication (e.g., medium access control (MAC) control element (MAC-CE)) to the UE to adjust the TA value for an uplink transmission. However, in a wireless communication system where the network devices are operating in a high mobility scenario, the TA may change frequently due to the shifting position or the change in location of one or more UEs or when one or more serving transmission reception points (TRPs) changes. That is, the wireless communication system may measure and configure each TA for each beam out of a set of beams and for multiple nodes. In some cases, the frequently changing TAs may increase the overhead of the wireless communication system.

The described techniques relate to improved methods, systems, devices, or apparatuses that supports techniques for machine learning (ML) based timing advance update. In some wireless communication systems, one or more network devices may use ML to handle multiple TAs for each transmitting beam between multiple network devices. In some examples, ML may use a past measured reference signal received power (RSRP) to predict future RSRP or to determine the location of the UE. In some cases, a ML model (e.g., a ML trained algorithm) may be trained to predict the TA based on channel measurement. That is, the UE may use the ML model to predict the TA value and autonomously apply the predicted TA value without explicit signaling from the network entity. In some examples, The TA prediction may take an input of one or more RSRPs of synchronization signal blocks (SSBs) or a PDP of a channel state information (CSI) RS from one or more beams, apply the ML prediction, and output the TA to be used for the one or more beams. In other examples, the TA of multiples nodes from a set of TA values (e.g., N) over a past time period may be inputted into the ML model and output the possible TA predictions of the nodes in the future. That is, the TA values outputted from the ML model may be applied to the one or more transmissions between network devices. Particular aspects of the subject matter described herein may be implemented to realize one or more potential advantages. The described techniques may provide for measuring and configuring multiple TAs for each beam without increasing the overhead.

Aspects of the disclosure are initially described in the context of wireless communications systems. Aspects of the disclosure are further illustrated by and described with reference to ML models and a process flow. Aspects of the disclosure are further illustrated by and described with reference to apparatus diagrams, system diagrams, and flowcharts that relate to ML based TA updates.

FIG. 1 illustrates an example of a wireless communications system 100 that supports ML based TA updates in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support ML based TA updates as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems 100, some network devices, such as one or more network entities 105 and one or more UEs 115, may use a TA to predict a round-trip time. For example, a network entity 105 may use the TA to set expectancies for timed transmissions and schedule transmissions with a UE 115. In some examples, to set the TA for one or more wireless communications, the network devices may measure the TA with a RACH triggered by a PDCCH order or through one or more RSs, such as one or more SRSs and TRSs. In some cases, the network entity 105 may measure the TA value and transmit an indication to the UE 115 to adjust the TA value for an uplink transmission. However, in the wireless communication system 100 where the network devices are operating in a high mobility scenario, the TA may change frequently due to the shifting position or location of the one or more UEs 115 or when one or more serving TRPs change for a particular UE 115. That is, the wireless communication system 100 may measure and configure each TA for each beam out of a set of beams and for multiple nodes. In some cases, the frequently changing TAs may increase the overhead of the wireless communication system 100.

In some implementations, the wireless communication system 100, may use ML to handle with multiple TAs for each beam between multiple network devices. In some examples, ML may use a past measured RSRP to predict future RSRP or determine the location of the UE 115. In some cases, a ML model may be trained to predict the TA based on channel measurement. That is, the UE 115 may use the ML model to predict the TA value and autonomously apply the predicted TA value without explicit signaling from the network entity 105. In some examples, The ML model performing TA prediction may receive an input of one or more RSRPs of SSBs or a PDP of a CSI-RS from one or more beams, apply the ML prediction, and output the TA of the one or more beams. In other examples, the TA of multiples nodes from a set of TA values over a past time period may be inputted into the ML model and output the possible TA predictions of the nodes in the future. That is, the TA values outputted from the ML model may be applied to the one or more transmissions between network devices.

Figure 2:
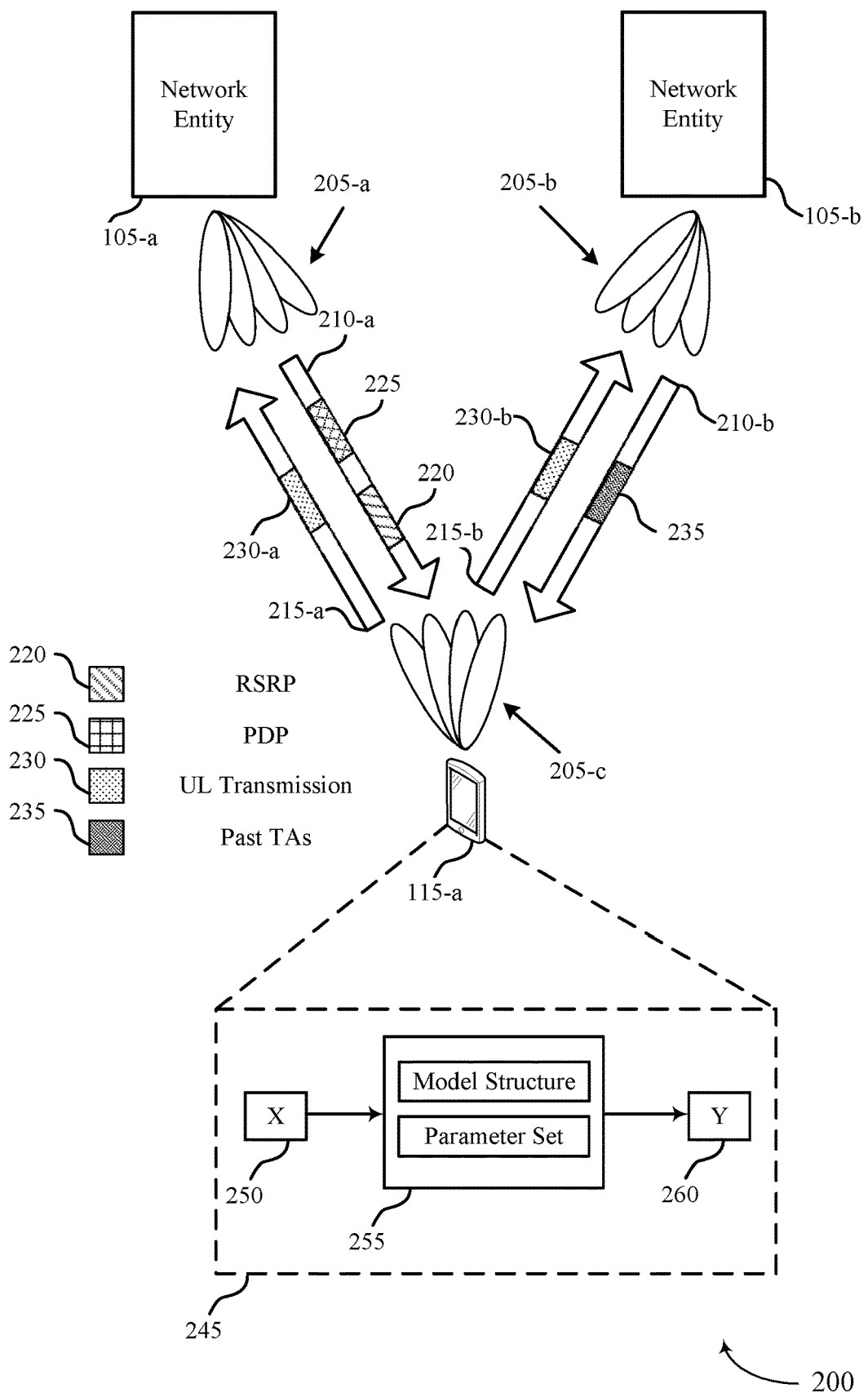
FIG. 2 illustrates an example of a wireless communications system that supports ML based TA updates in accordance with one or more aspects of the present disclosure.

FIG. 2 illustrates an example of a wireless communications system 200 that supports ML based TA updates in accordance with one or more aspects of the present disclosure. In some examples, the wireless communications system 200 may implement aspects of the wireless communications system 100. The wireless communications system 200 may include a UE 115-a, a network entity 105-a, and a network entity 105-b, which may be examples of corresponding devices as described herein, including with reference to FIG. 1.

In some implementations, the wireless communication system 200 may support network devices, such as the UE 115-a, the network entity 105-a, and the network entity 105-b. In some examples, a round-trip time may include the total time duration between two network devices. For example, the round-trip time may include the time it takes for the UE 115-a to transmit a message to the network entity 105-a along with the additional time it takes for the network entity 105-a to transmit a response message back to the UE 115-a. In some cases, the round-trip time may be dependent on a propagation environment. In some aspects, the network devices may consider the round-trip time for scheduling transmissions. For example, the UE 115-a may use the TA to transmit an uplink transmission prior to the network entity 105-a transmitting an uplink reception. In such examples, the UE 115-a may account for the round-trip time (e.g., half of the round-trip time) it takes for a message to be received at the network entity 105-a. The UE 115-a may transmit a message that accounts for the transmission travel time, such that the network entity 105-a receives the message before transmitting the uplink reception.

In some examples, to set the TA for the wireless communications, the network devices may measure the TA with a RACH triggered by a PDCCH order or through one or more RSs, such as one or more SRSs and TRSs. In some cases, the network entity 105 may measure the TA value with either SRS or RACH and transmit an indication (e.g., MAC-CE) to the UE 115 to adjust the TA value for an uplink transmission. In some examples, the network entity 105-a may have access to the TA value while the UE 115-a may receive the TA value.

In some wireless communication networks (e.g., millimeter wave (mmW) networks), the UE 115-a and the network entity 105-a may perform directional beamforming 205 to form a beamformed channel. In this example, the UE 115-a may use a set of directional beams 205-a to communicate with a set of directional beams 205-a associated with the network entity 105-a and to communicate with a set of directional beams 205-b associated with the network entity 105-b. In some examples, the UE 115-a may use access links to the one or more network entities 105 via different beams 205 or multiple network entities 105 or TRPs. In some cases, each beamformed link between the UE 115-a and another device may use different TAs.

In some implementations, the wireless communication system 200 may allow network devices to operate in a high mobility scenario. In some examples, the TA may change frequently due to the shifting position or location of the UE 115-a or when one or more serving TRPs change. That is, the wireless communication system 200 may measure and configure each TA for each beam out of a set of beams 205 and for multiple nodes. In some cases, the frequently changing TAs may increase the overhead of the wireless communication system 200.

In some examples, the TA values may be grouped together. In some aspects, beam management for the wireless communication system 200 may include multiple input multiple output (MIMO) enhancement for frequency bands (e.g., FR2) and how to configure the UE 115-a with multiple (e.g., different) cells or TRPs with multiple TA groups. In some cases, the multiple cells and TRPs may include different propagation distances to the UE 115-a and may use a different TA value. In some cases, signaling design may aim to separate configuration signaling for RSs or channels from different cells or TRPs. In some examples, multiple TA groups may be configured for TRPs and cells, in which each TA group may indicate a different TA value. In some cases, the TA of different TA groups may be updated (by the network entity) via a separate signaling. In some aspects, grouping the TA values into multiple TA groups may increase overhead as the wireless communication system 200 may track and configure each of the TAs in the TA group for uplink communication. In some high speed scenarios, the TA of the uplink transmission may require a faster update which is similar to a Doppler compensation scenario.

In some wireless communication systems 200 (e.g., radio access networks (RANs)) may use artificial intelligence (AI) and ML techniques for over the air interface communication. In some cases, the wireless communication system 200 may implement AI and ML techniques for CSI feedback enhancement (e.g., overhead reduction, improved accuracy, prediction), beam management (e.g., beam prediction in time, and/or spatial domain overhead and latency reduction, beam selection, accuracy improvement), and positioning accuracy enhancements for different scenarios (e.g., scenarios with non-line of sight (NLOS) conditions). In some examples, the wireless communication system 200 may use AI and ML techniques and may implement AI or ML framework that includes terminology, capability indication, configuration procedures (e.g., training, inference), validation and testing procedures, management of data, and an AI or ML model. In some examples, the wireless communication system 200 may introduce ML techniques in air interface design to utilize past measured RSRPs for beam prediction (e.g., predict future beam's channel metric) or use the positions of UEs (e.g., locations) for TA. In some cases, the ML techniques may allow the wireless communication system 200 to measure RSRP to predict the future RSRP for a UE's location.

In some implementations, the wireless communication system 200, may use ML to handle multiple TAs for each beam between multiple network devices. In some examples, the UE 115-a may use ML by implementing a ML model 245 (e.g., a ML module). In some examples, the ML model 245 may implement a neural network function (NNF), in which a function (e.g., Y=F(x)) is supported by a neural network (NN) model 255. In some cases, each NNF is identified by a standardized NNF identification (ID). In other cases, private extensions of the NN model 255 may use non-standardized IDs for NNFs. In some aspects, the NNF may include an input 250 (e.g., X) and an output 260 (e.g., Y), which are standardized for each of the NNFs. In some examples, the standardized input 250 and output 260 may include an information element (IE) for inter-vendor interworking and other optional IEs may be available for flexible implementation for the NNF. In some examples, the NNF may be supported by multiple models (e.g., vendor specific implementation).

In some implementations, the NN model 255 may include a model structure and a parameter set. In some examples, the model structure may include a model ID that is unique in the network and associated with the NNF. In some cases, the model structure includes a default parameter set, in which the parameter set includes weights of the NN model 255 and other configuration parameters such as location or is configuration specific to the NN model 255. In some cases, the NN model 255 may be defined by an operator, an infra-vendor, or a third party (e.g., original equipment manufacturers (OEMs)).

In some implementations of the present disclosure, the UE 115-a may connect to one or more nodes with varying TA values. In some examples, configuring multiple TAs from different nodes may utilize more overhead compared to a single TA group case. In some aspects, the TA values may be frequently updated to keep up with conditions in a high speed scenario and current TA configuration methods may not meet the requirements (e.g., signaling is slow to update in time, frequent updates to the TA increases levels of overhead) to support multiple TAs. Additionally or alternatively, the TA of the uplink transmission is related to one or more UEs 115 in a cell and may be less dynamic compared to RSRPs of different beams. In some cases, the ML model 245 may be suited for UE 115-a positioning and beam predication while predicting TA based on the same inputs provided for the UE 115-a positioning and beam prediction (e.g., a RSRP, a PDP of different beams over time). That is, the wireless communication system 200 may benefit from ML for multiple TAs.

As described herein, the wireless communications system 200 may implement the ML model 245 to predict TA values. In some examples, the TA value is relevant to the propagation environment and a channel measurement (e.g., a RSRP measurement) and may be used to represent the conditions of the environment. In some cases, the channel measurement (e.g., a RSRP measurement in the past, positioning information) may be used to train the ML model 245 to predict the TA. For example, the network entity 105-a may communicate an RSRP 220 of a SSB via beams 205-a and a downlink channel 210-a to a set of beams 205-c at the UE 115-a. In other examples, the network entity 105-a may communicate a PDP 225 of a possible CSI-RS via beams 205-a and a downlink channel 210-a to the UE 115-a. In some cases, the RSRP 220 and the PDP 225 may be input measurement parameters to be used for the ML model 245. The RSRP 220 or PDP 225 may be inputted into the NNF as the input 250 to produce the TA prediction. In other examples, the input 250 for the NNF may include RSRP, PDP of certain beams, network entities, or TRPs, a TA of some other link, a UE location measured by a global positioning system (GPS), a positioning signaling, sensing such as RF sensing, camera, radar at UE, network entity, TRP, or a transmit control information (TCI) ID, or a link to predict. In some cases, the TA prediction is the output 260 when the input 250 is entered into the NN model 255. In some examples, the TA prediction may represent a TA of a non-measurement or non-configured link. The UE 115-a may use the set of beams 205-c to transmit an uplink transmission 230-a based on the TA prediction via an uplink channel 215-a.

Additionally or alternatively, the UE 115-a may use the ML model 245 to predict the TA and autonomously apply the predicted TA value to the communication without signaling from one or more network entities 105. For example, the network entity 105-b may communicate a set of past TAs 235 via beams 205-a and a downlink channel 210-b to the set of beams 205-c at the UE 115-a. In some cases, the past TAs 235 may be used as input measurement parameters to be used for the ML model 245. The past TAs 235 may be inputted into the NNF as the input 250 to output the TA prediction for one or more future TA values. In some cases, the output 260 may result from or may include the TA prediction of the input 250 that was entered into the NN model 255. In some implementations, the UE 115-a may use the set of beams 205-c to transmit an uplink transmission 230-b based on the future TA prediction via an uplink channel 215-b.

In some cases, the UE 115-a may run a ML model 245 to predict a TA for a link. In some cases, the predicted TA may correspond to a future time or for a link, in which the TA is not configured by the network entity 105-a. In some examples, the predicted TA may correspond to a TA group. In some implementations, the UE 115-a may autonomously apply the predicted TA to the corresponding uplink link at a corresponding time.

In some aspects, the ML model 245 may be configured by the network entity (e.g., network entity 105-a or network entity 105-b) or a third party server. In some examples, the network entity 105-a may collect a set of TA values based on RSRP measured at the UE 115-a. In some cases, the network entity 105-a may transmit the TA values to train the ML model 245 (e.g., offline train the ML module) at the UE 115-a. In some examples, the network entity 105-a may transmit one or more parameters or parameter updates to the UE 115-*a*. In some instances, the parameter updates may be used in the ML model 245 to predict the TA value.

In some implementations, the network entity 105-*a* may configure RSs to measure the input 250 (e.g., configure the CSI-RS to measure the RSRP input). In some cases, the network entity 105-*a* may identify that the RSRP may be a measurement parameter that may be used as input 250 for the ML model 245. In some examples, the association between the input port and the measured RS may be pre-configured by the network entity 105-*a*. In some aspects, the UE 115-*a* may measure the RSRPs associated with the CSI-RSs as the possible input 250 to predict the TA value.

In some examples, the ML model 245 may include multiple outputs 260, in which each output port may correspond to a link or multiple links that may share the same TA prediction. In such cases, the UE 115-*a* may determine that the predicted TA value corresponds to an output port associated with the ML model 245. In some examples, the UE 115-*a* may identify an association between the links and TA output that may be pre-configured by the network entity 105-*a* (e.g., a TA port X corresponds to a cell ID Y or a TA group X). The UE 115-*a* may identify a mapping between the cell-ID or a TA group identifier and the output port associated to the ML model 245 that outputs the predicted TA value.

In some implementations of the present disclosure, the ML model 245 may determine a future TA prediction for an uplink transmission without assistance from the network entity 105-*a*. In some examples, a large estimation error may occur and the network entity 105-*a* may trigger an explicit TA measurement requesting that the UE 115-*a* refrain from using the autonomous TA prediction for additional uplink transmissions. In such examples, the network entity 105-*a* may request to pause the TA prediction as a fallback scheme. In some cases, the network entity 105-*a* may ask the UE 115-*a* to transmit one or more inputs 250 of the ML model 245 that corresponds to the error case to collect data for refining the ML model 245. Additionally or alternatively, the network entity 105-*a* may trigger the UE 115-*a* to transmit RACH or SRSs so the network entity 105-*a* may measure the TA value. In some cases, the network entity 105-*a* may use the TA measurement and feedback transmitted from the UE 115-*a* to update the ML model 245.

In some aspects, the input 250 of the ML model 245 may include measured channel metrics of multiple beams 205 (e.g., RSRPs, channel impulse response (CIR) or PDPs of SSBs or CSI-RSs) and other configured TAs of other links. For example, the UE 115-*a* may configure the TA with a first TRP at an initial time (e.g., a time 0) may be used to predict the TA to the first TRP at a future time. In some examples, the UE 115-*a* may transmit the uplink communication 230 at a first time instance based on the predicted TA value outputted when one or more measurement parameters included a set of TA values corresponding to previous TA values before the first time instance. In other examples, the predicted TA value may use measurement parameters associated with another network entity 105 (e.g., a second network entity). For example, in a high speed scenario the TA of the first TRP, which is configured by the network entity 105-*a*, may be a function of TA of a second TRP, which is computed based on the configured function that is computed. In some examples, the input 250 of the ML model 245 may include positioning information from a positioning reference signal (PRS) or a geographic routing protocol (GRP) measurement. In some cases, the UE 115-*a* may measure the speed and orientation of the UE 115-*a*.

In some aspects, the UE 115-*a* may transmit a capability report to the network entity 105-*a* that indicates that the UE 115-*a* may support autonomous update TA values. In some examples, the UE 115-*a* may autonomously update the TA values based on prediction of TA values without assistance from the network entity 105-*a*. In some cases, the capability report may include information about whether the UE 115-*a* may support the TA group module type, the quantity of TA groups for the autonomous update, and a type of input for TA prediction.

Additionally or alternatively, some wireless communication systems 200 may implement integrated access and backhaul (IAB) networks, in which the distributed units (DUs) of children nodes may change the uplink receiving timing for the UE 115-*a* based on a configuration of the parent node. In some cases, the parent node indicates an instruction or configuration for the DU, which may be a children node of the parent node. In such cases, the uplink timing change of the DU may result in an update of TA for the UE 115-*a* (e.g., by a delta value for all links connecting to the DU node). In some examples, the DU may update the prediction module or alternatively broadcast the adjustment values to the one or more serving UEs 115.

FIG. 3 illustrates an example of ML models 300*a* and 300-*b* that support ML based TA updates in accordance with one or more aspects of the present disclosure. The ML models 300-*a* and 300-*b* may implement or be implemented by aspects of the wireless communication systems 100 and 200 described with reference to FIGS. 1 and 2, respectively.

Figure 3A:
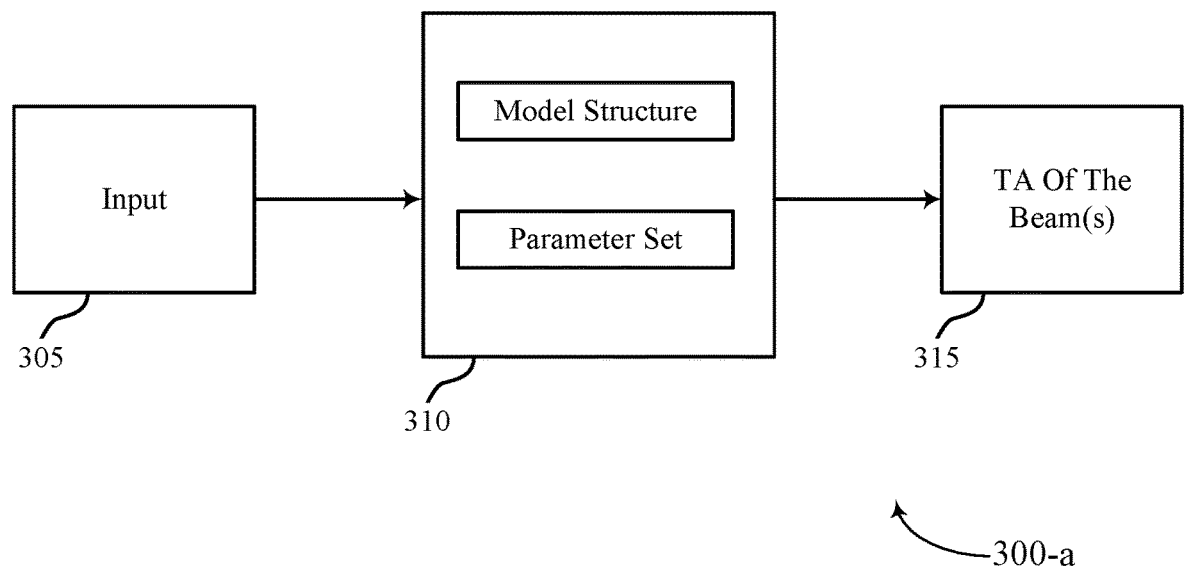
FIGS. 3A and 3B illustrate examples of ML models that supports ML based TA updates in accordance with one or more aspects of the present disclosure.

In some aspects of the present disclosure, as depicted in FIG. 3A, a UE 115 may implement a ML model 300-*a* to output a TA value. In some examples, the ML model 300-*a* may represent a NNF which takes an input and produces an output. In some cases, the ML model 300-*a* may use an input 305 for a NN model 310. In some cases, the input 305 may include one or more measurement parameters transmitted from the network entity 105 via beams (e.g., one or more RSRPs of SSBs, a PDP of CSI-RSs). In some cases, the NN model 310 may include a model structure with a model ID and a parameter set with one or more weights of the NN model 310 and other configuration parameters. In some examples, the input 305 is used for the NN model 310 to provide an output 315 which may include the TA of the one or more beams. In some cases, the output 315 may include the TAs for each respective beam and may be applied to the beams used for an uplink communication from the UE 115 to the network entity 105.

Figure 3B:
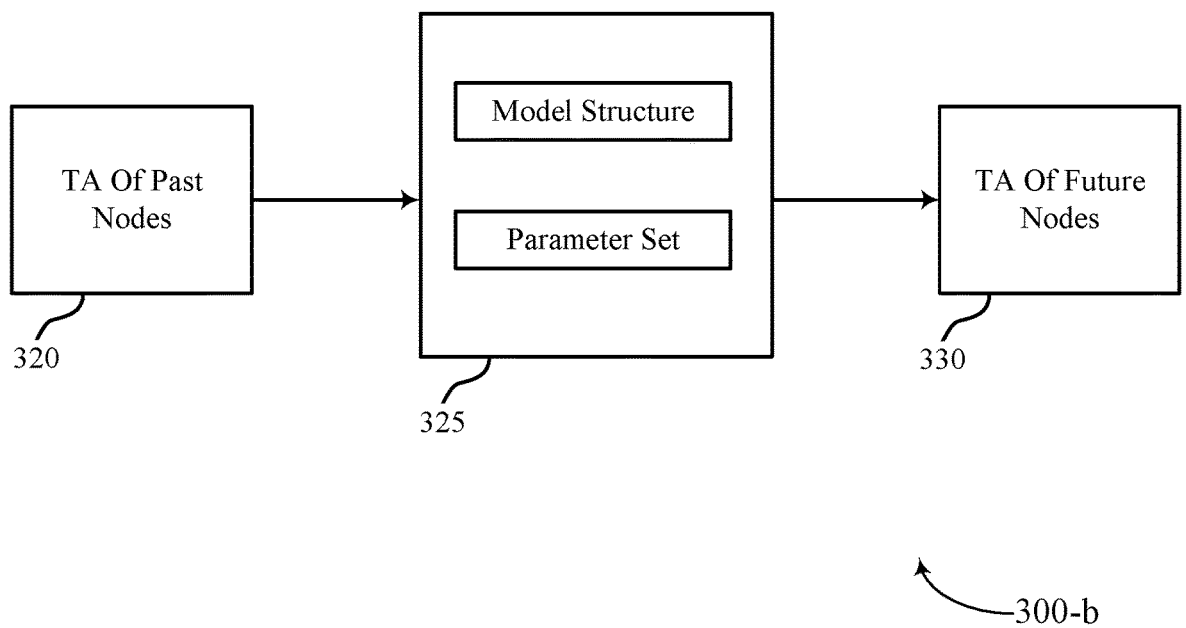

In some aspects, as depicted in FIG. 3B, the UE 115 may implement a ML model 300-*b* to predict the TA value for a specific node (e.g., UEs, network entities, DUs, TRPs, or the like). In some cases, the ML model 300-*b* may represent a NNF which takes an input and produces an output. In some cases, the ML model 300-*b* may use an input 320 in the form of TA values over a time duration for the node. In some cases, the input 320 may represent a set of TA values that have occurred in the past for the node. In some examples, the NN model 325 may include a model structure with a model ID and a parameter set with one or more weights of the NN model 325 and other configuration parameters. In some examples, the input 320 is used for the NN model 325 to provide an output 330 which may predict the upcoming TA values of the node. In some cases, the output 330 provide future TA values that the node may use for an uplink communication from the UE 115 to the network entity 105.

Figure 4:
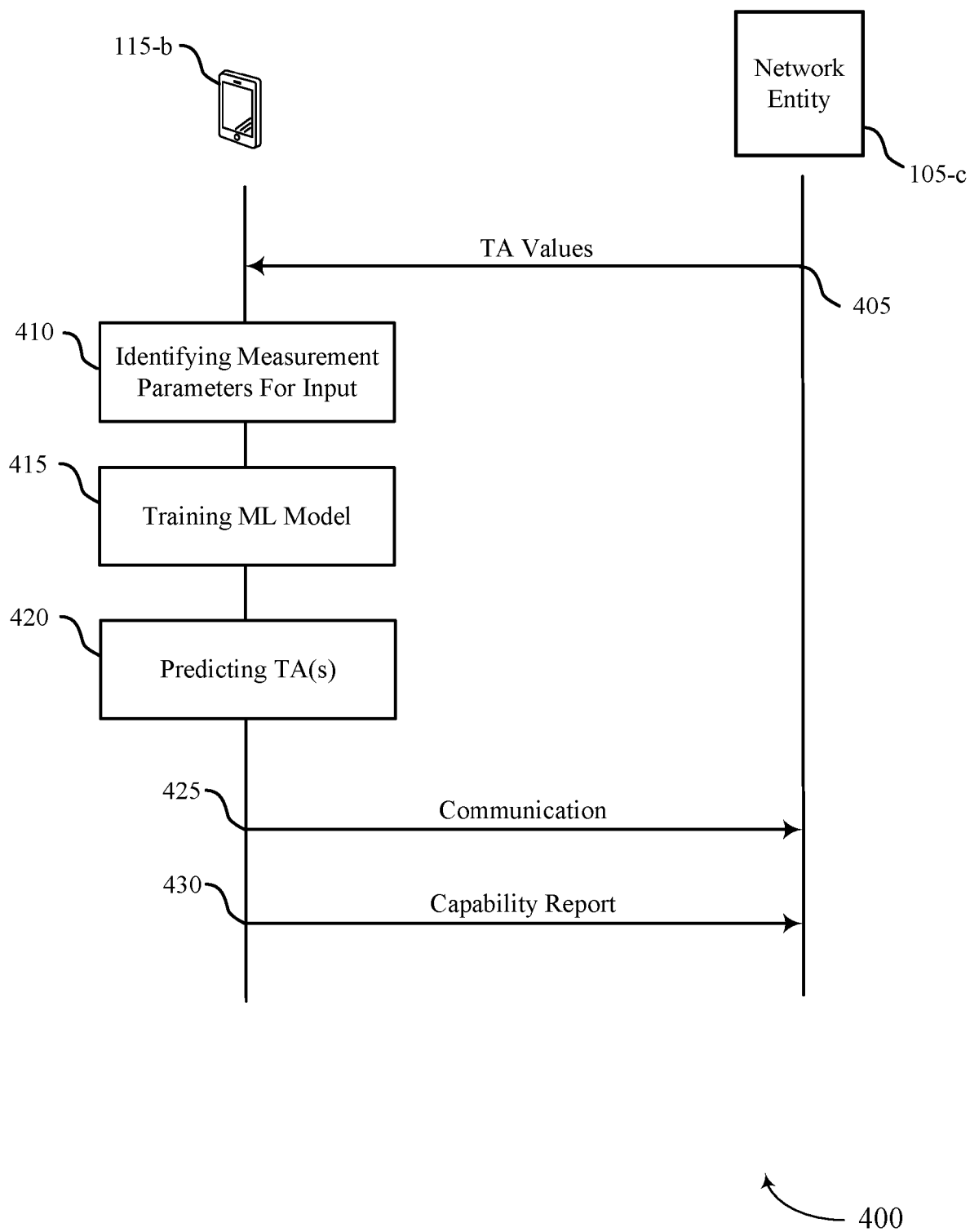
FIG. 4 illustrates an example of a process flow that supports ML based TA updates in accordance with one or more aspects of the present disclosure.

FIG. 4 illustrates an example of a process flow 400 that supports ML based TA updates in accordance with one or more aspects of the present disclosure. In some examples, the process flow 400 may implement aspects of the wireless communications systems 100 and 200 and the ML models 300. The process flow 400 may include a UE 115-*b* and a network entity 105-*c*, which may be examples of corresponding devices as described herein, including with reference to FIGS. 1-3.

At 405, the network entity 105-*c* may transmit one or more TA values. In some examples, the TA values may be based on one or more RSRP measurements at the UE 115-*b*.

At 410, the UE 115-*b* may identify measurement parameters to input into a ML model. In some cases, the UE 115-*b* may identify measurement parameters by measuring one or more RSRP values associated with one or more CSI-RSs. Additionally or alternatively, the measurement parameters for the ML model may include PDP associated with one or more beams, a PDP associated with the network entity 105-*c*, a PDP associated with one or more TRPs, a TA value for a communication link, a location of the UE 115-*b*, a positioning signaling information associated with RF sensing, the positioning signaling information associated with a camera, the positioning signaling information associated with a radar at the UE 115-*b*, a TCI ID, or a combination of the measurement parameters listed.

At 415, the UE 115-*b* may train the ML model based off the TA values and the measurement parameters used for input. In some cases, the ML model may include a NNF that uses an input, uses a NN model to apply a model structure and parameter set to the input, and produces an output At 420, the UE 115-*b* may take the output of the ML model to predict one or more TA values for one or more beams or future TA values for a specific node. In some examples, the outputted TA value may be applied to a communication between the UE 115-*b* and the network entity 105-*c*.

At 425, the UE 115-*b* may transmit an uplink communication to the network entity 105-*c*. In some examples, the one or more TA values predicted at 420 may be implemented into the uplink communication to enable the UE 115-*b* to account for the time it takes for a transmission to travel to the network entity 105-*c*.

At 430, the UE 115-*b* may transmit an additional capability report indicating a capability of the UE 115-*b* for supporting autonomous update of TAs to the network entity 105-*c*. In some examples, the UE 115-*b* may support autonomous update of TAs based on the predicted TAs at 420. In some cases, the capability report may include the capability of the UE 115-*b* to support at least one TA group module type, a quantity of TA groups for the autonomous update TA, a type of input for TA prediction, or a combination of capabilities. In some cases, the capability report indicates the ability for the UE 115-*b* to update the TA values without assistance from the network entity 105-*c*.

Figure 5:
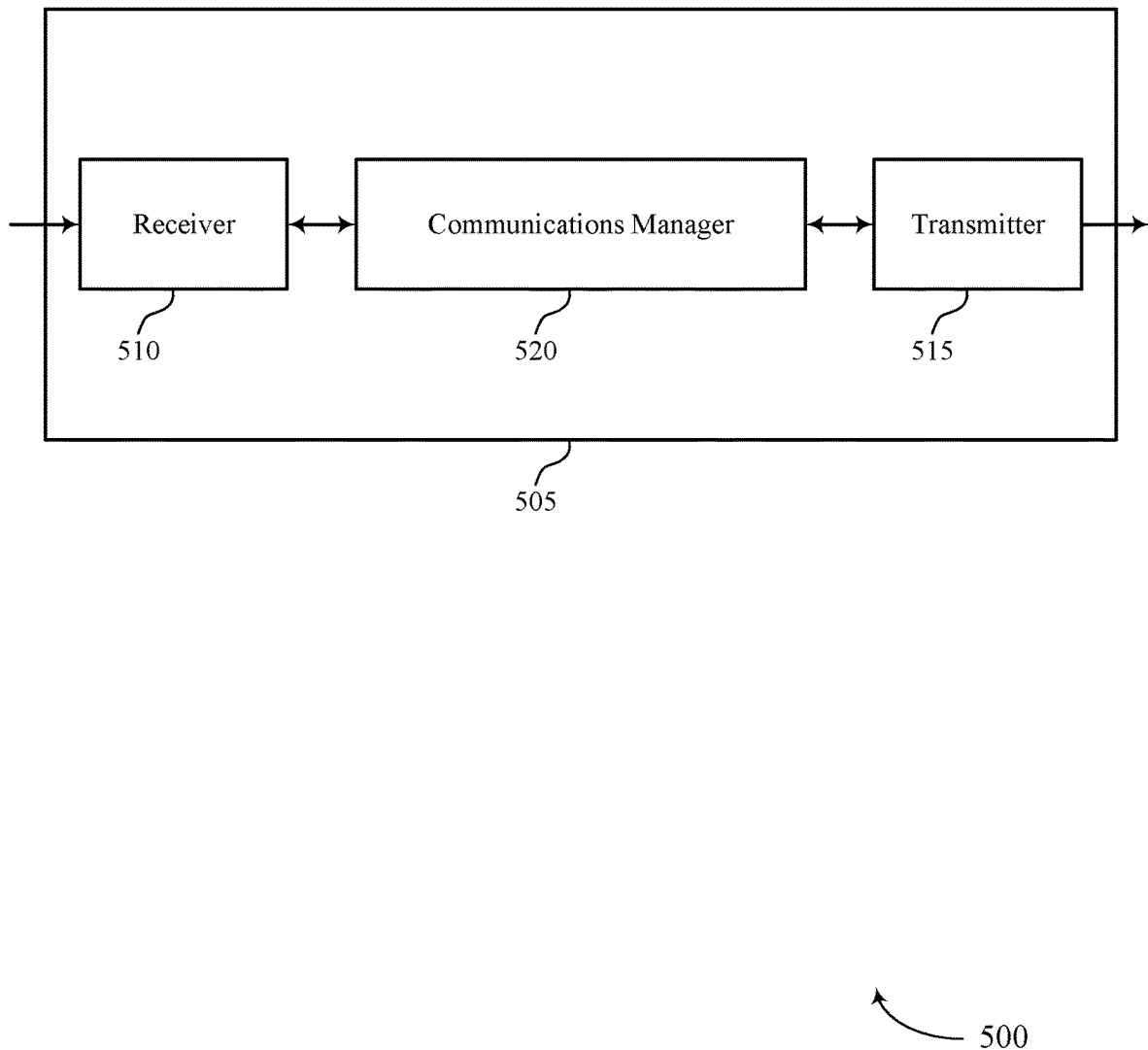
FIGS. 5 and 6 show block diagrams of devices that support ML based TA updates in accordance with one or more aspects of the present disclosure.

FIG. 5 shows a block diagram 500 of a device 505 that supports ML based TA updates in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to ML based TA updates). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to ML based TA updates). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of ML based TA updates as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for identifying one or more measurement parameters for inputting to a ML model. The communications manager 520 may be configured as or otherwise support a means for predicting a TA value for an uplink communication from the UE to a network entity based on inputting the one or more measurement parameters to the ML model. The communications manager 520 may be configured as or otherwise support a means for transmitting, to the network entity, the uplink communication in accordance with the predicted TA value.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources.

Figure 6:
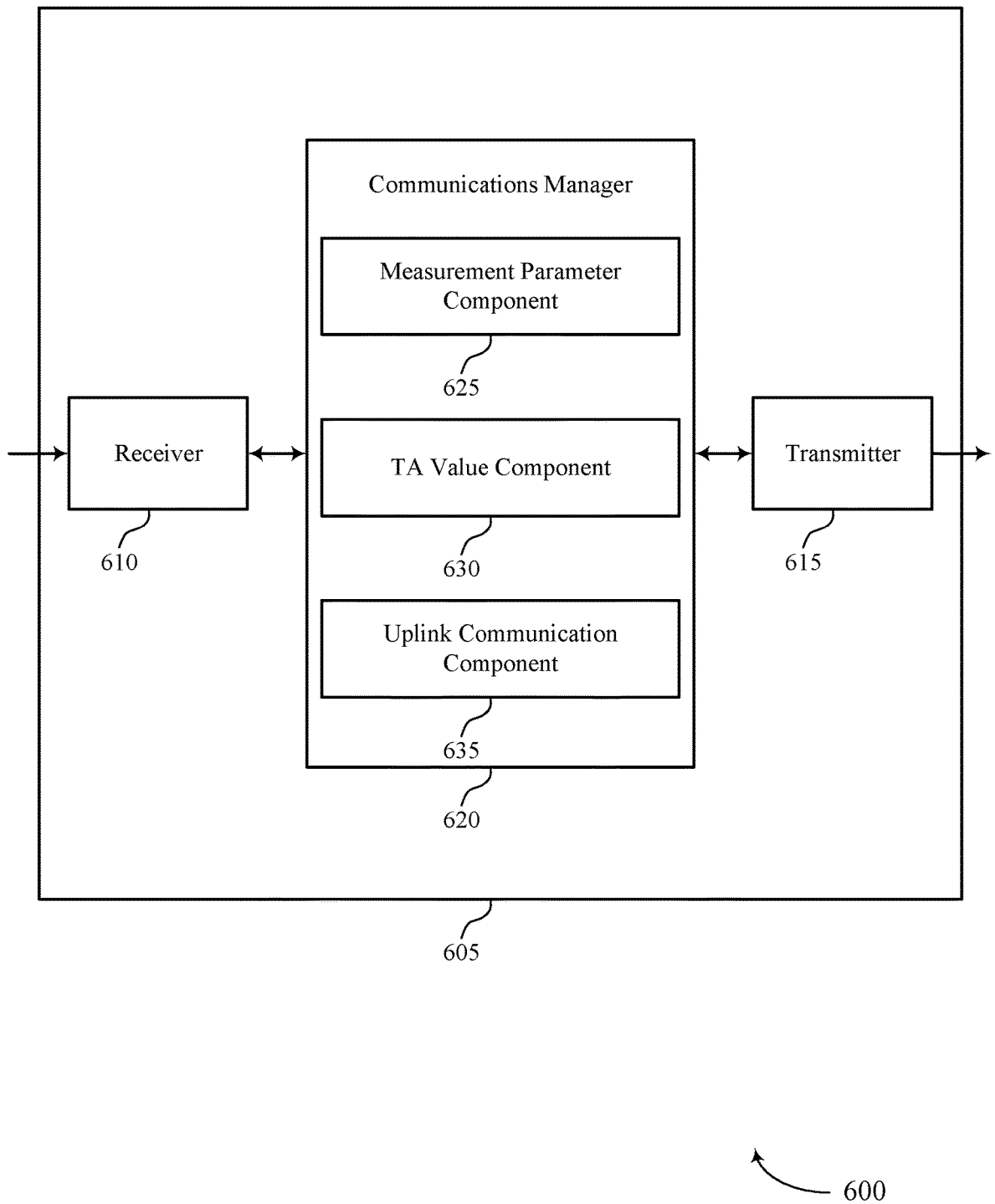

FIG. 6 shows a block diagram 600 of a device 605 that supports ML based TA updates in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to ML based TA updates). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to ML based TA updates). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of ML based TA updates as described herein. For example, the communications manager 620 may include a measurement parameter component 625, a TA value component 630, an uplink communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The measurement parameter component 625 may be configured as or otherwise support a means for identifying one or more measurement parameters for inputting to a ML model. The TA value component 630 may be configured as or otherwise support a means for predicting a TA value for an uplink communication from the UE to a network entity based on inputting the one or more measurement parameters to the ML model. The uplink communication component 635 may be configured as or otherwise support a means for transmitting, to the network entity, the uplink communication in accordance with the predicted TA value.

Figure 7:
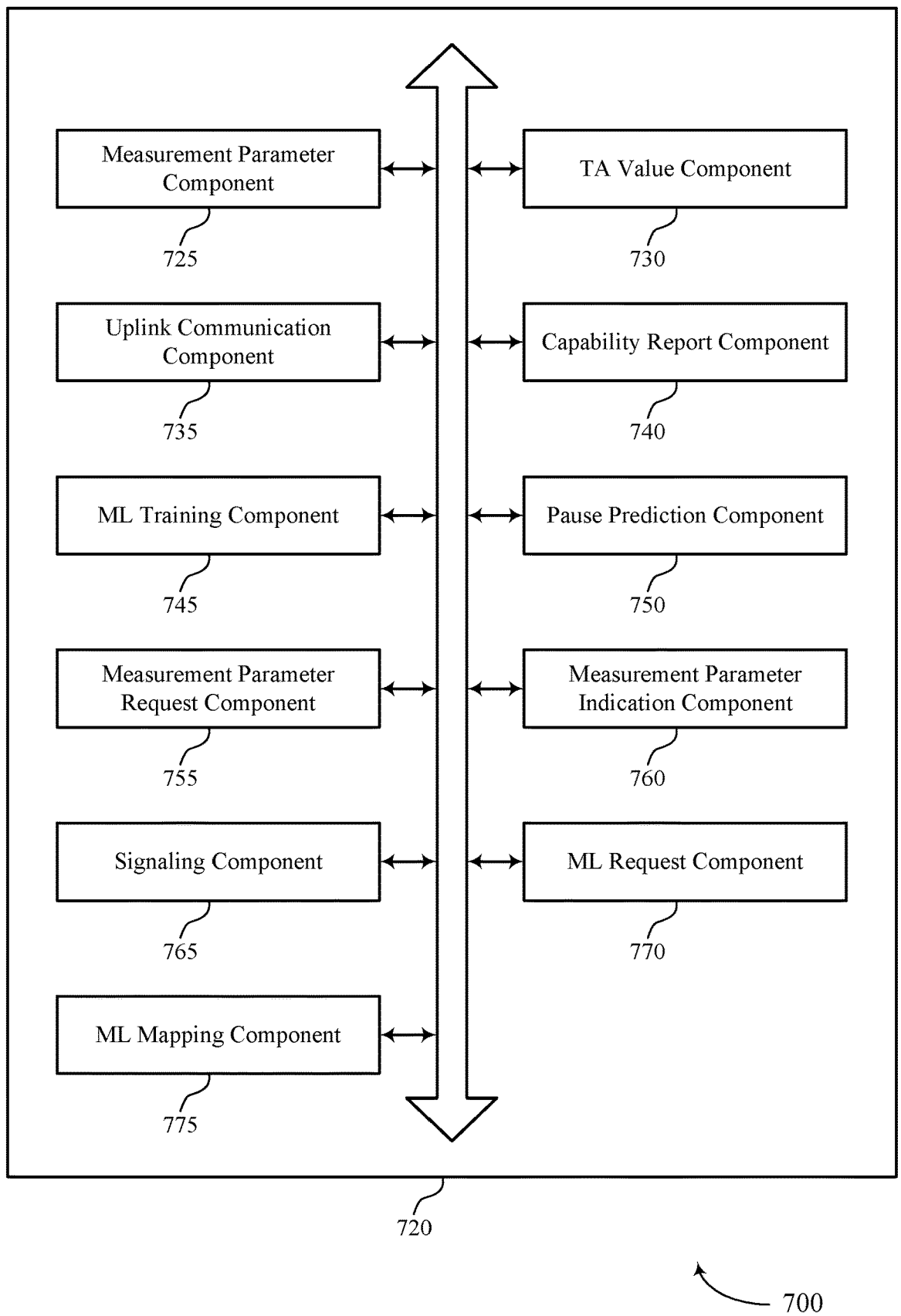
FIG. 7 shows a block diagram of a communications manager that supports ML based TA updates in accordance with one or more aspects of the present disclosure.

FIG. 7 shows a block diagram 700 of a communications manager 720 that supports ML based TA updates in accordance with one or more aspects of the present disclosure. The communications manager 720 may be an example of aspects of a communications manager 520, a communications manager 620, or both, as described herein. The communications manager 720, or various components thereof, may be an example of means for performing various aspects of ML based TA updates as described herein. For example, the communications manager 720 may include a measurement parameter component 725, a TA value component 730, an uplink communication component 735, a capability report component 740, an ML training component 745, a pause prediction component 750, a measurement parameter request component 755, a measurement parameter indication component 760, a signaling component 765, an ML request component 770, an ML mapping component 775, or any combination thereof. Each of these components may communicate, directly or indirectly, with one another (e.g., via one or more buses).

The communications manager 720 may support wireless communication at a UE in accordance with examples as disclosed herein. The measurement parameter component 725 may be configured as or otherwise support a means for identifying one or more measurement parameters for inputting to a ML model. The TA value component 730 may be configured as or otherwise support a means for predicting a TA value for an uplink communication from the UE to a network entity based on inputting the one or more measurement parameters to the ML model. The uplink communication component 735 may be configured as or otherwise support a means for transmitting, to the network entity, the uplink communication in accordance with the predicted TA value.

In some examples, the capability report component 740 may be configured as or otherwise support a means for transmitting, to the network entity, a capability report indicating a capability for the UE to support autonomous update of TA based on predicting the TA value.

In some examples, the capability report further indicates the capability for the UE to support at least one of a TA group module type, a quantity of TA groups for the autonomous update of TA, a type of input for TA prediction, or a combination thereof.

In some examples, the TA value component 730 may be configured as or otherwise support a means for receiving, from the network entity, an indication of a set of TA values, where the set of TA values is based on at least one reference signal received power measurement at the UE. In some examples, the ML training component 745 may be configured as or otherwise support a means for training the ML model based on the set of TA values, where predicting the TA value is based on inputting the one or more measurement parameters to the trained ML model.

In some examples, to support identifying the one or more measurement parameters, the measurement parameter component 725 may be configured as or otherwise support a means for measuring one or more reference signal received power values associated with one or more channel state reference signals, where predicting the TA value is based on inputting the one or more one or more reference signal received power values to the ML model.

In some examples, the TA value component 730 may be configured as or otherwise support a means for determining that the predicted TA value corresponds to an output port associated with the ML model. In some examples, the ML mapping component 775 may be configured as or otherwise support a means for identifying a mapping between a cell identifier and the output port associated with the ML model, where transmitting the uplink communication includes transmitting the uplink communication associated with the cell identifier in accordance with the predicted TA value.

In some examples, the ML mapping component 775 may be configured as or otherwise support a means for identifying a mapping between a TA group identifier and the output port associated with the ML model, where transmitting the uplink communication includes transmitting the uplink communication associated with the TA group identifier in accordance with the predicted TA value.

In some examples, the pause prediction component 750 may be configured as or otherwise support a means for receiving, from the network entity, a request to pause predicting a future TA value for a second uplink communication. In some examples, the TA value component 730 may be configured as or otherwise support a means for refraining from predicting the future TA value for the second uplink communication based on receiving the request.

In some examples, the measurement parameter request component 755 may be configured as or otherwise support a means for receiving, from the network entity, a request for the one or more measurement parameters inputted to the ML model. In some examples, the measurement parameter indication component 760 may be configured as or otherwise support a means for transmitting, to the network entity, an indication of the one or more measurement parameters in response to the request.

In some examples, the signaling component 765 may be configured as or otherwise support a means for transmitting, to the network entity, a random access signal or a sounding reference signal or both. In some examples, the TA value component 730 may be configured as or otherwise support a means for receiving, from the network entity, an indication of a second TA value based on transmitting the random access signal or the sounding reference signal or both.

In some examples, the ML request component 770 may be configured as or otherwise support a means for receiving, from the network entity, a request to update the ML model. In some examples, the TA value component 730 may be configured as or otherwise support a means for updating the ML model based on the request, where predicting the TA value is based on inputting the one or more measurement parameters to the updated ML model.

In some examples, to support transmitting the uplink communication, the uplink communication component 735 may be configured as or otherwise support a means for transmitting, to the network entity, the uplink communication at a first time instance in accordance with the predicted TA value, where the one or more measurement parameters include a set of TA values corresponding to a set of time instances prior to the first time instance.

In some examples, the measurement parameter component 725 may be configured as or otherwise support a means for the one or more measurement parameters include at least one TA value associated with a second network entity.

In some examples, the one or more measurement parameters include at least one of a reference signal received power, a power delay profile associated with one or more beams, a power delay profile associated with the network entity, a power delay profile associated with one or more transmission and reception points, a TA value for a communication link, a location of the UE, a positioning signaling information associated with radio frequency sensing, the positioning signaling information associated with a camera, the positioning signaling information associated with a radar at the UE, a transmission configuration indicator identifier, or a combination thereof.

Figure 8:
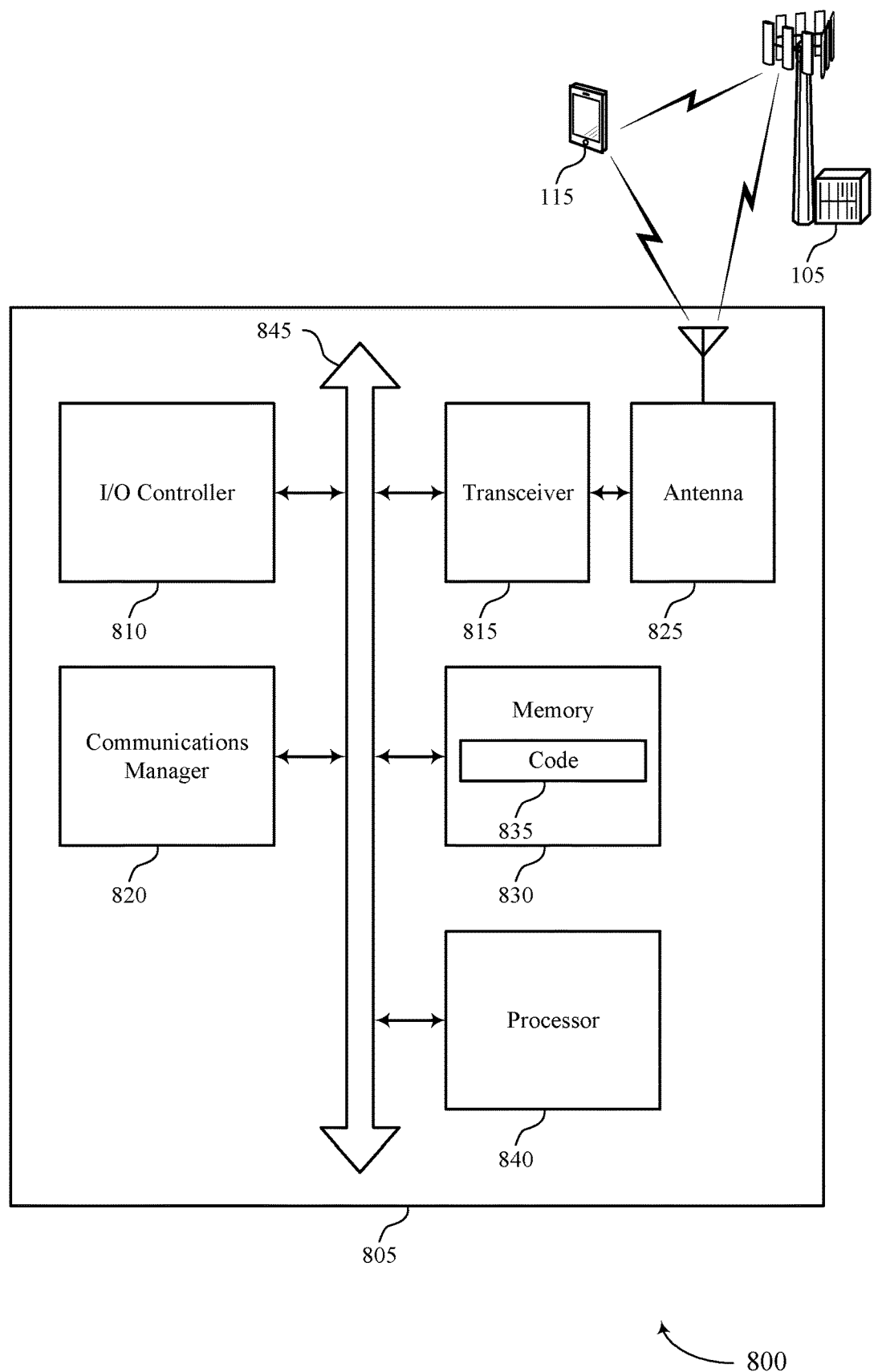
FIG. 8 shows a diagram of a system including a device that supports ML based TA updates in accordance with one or more aspects of the present disclosure.

FIG. 8 shows a diagram of a system 800 including a device 805 that supports ML based TA updates in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting ML based TA updates). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying one or more measurement parameters for inputting to a ML model. The communications manager 820 may be configured as or otherwise support a means for predicting a TA value for an uplink communication from the UE to a network entity based on inputting the one or more measurement parameters to the ML model. The communications manager 820 may be configured as or otherwise support a means for transmitting, to the network entity, the uplink communication in accordance with the predicted TA value.

By including or configuring the communications manager 820 in accordance with examples as described herein, the device 805 may support techniques for improved communication reliability, reduced latency, improved user experience related to reduced processing, reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of ML based TA updates as described herein, or the processor 840 and the memory 830 may be otherwise configured to perform or support such operations.

Figure 9:
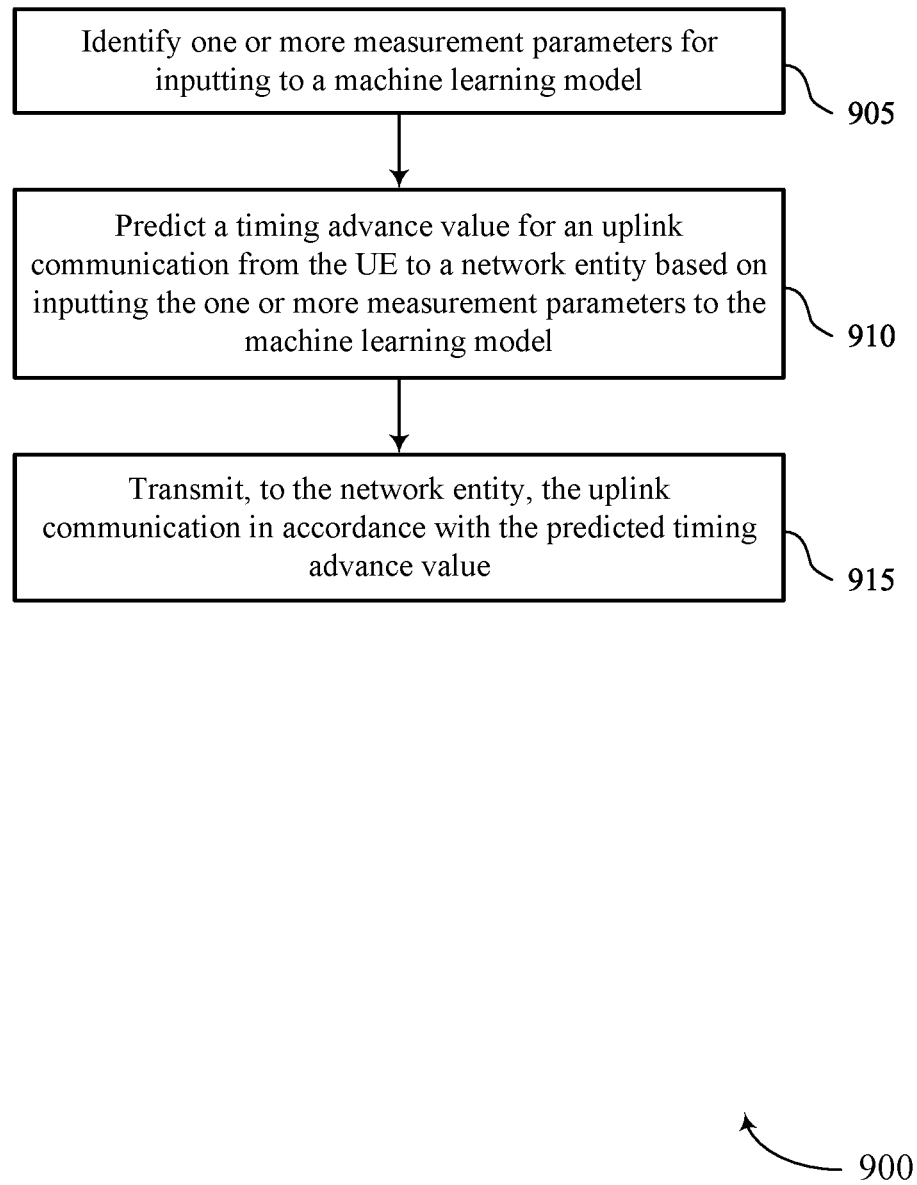
FIGS. 9 through 11 show flowcharts illustrating methods that support ML based TA updates in accordance with one or more aspects of the present disclosure.

FIG. 9 shows a flowchart illustrating a method 900 that supports ML based TA updates in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include identifying one or more measurement parameters for inputting to a ML model. The operations of 905 may be performed in accordance with examples as disclosed herein. In some examples, aspects of the operations of 905 may be performed by a measurement parameter component 725 as described with reference to FIG. 7.

At 910, the method may include predicting a TA value for an uplink communication from the UE to a network entity based on inputting the one or more measurement parameters to the ML model. The operations of 910 may be performed in accordance with examples as disclosed herein. In some examples, aspects of the operations of 910 may be performed by a TA value component 730 as described with reference to FIG. 7.

At 915, the method may include transmitting, to the network entity, the uplink communication in accordance with the predicted TA value. The operations of 915 may be performed in accordance with examples as disclosed herein. In some examples, aspects of the operations of 915 may be performed by an uplink communication component 735 as described with reference to FIG. 7.

Figure 10:
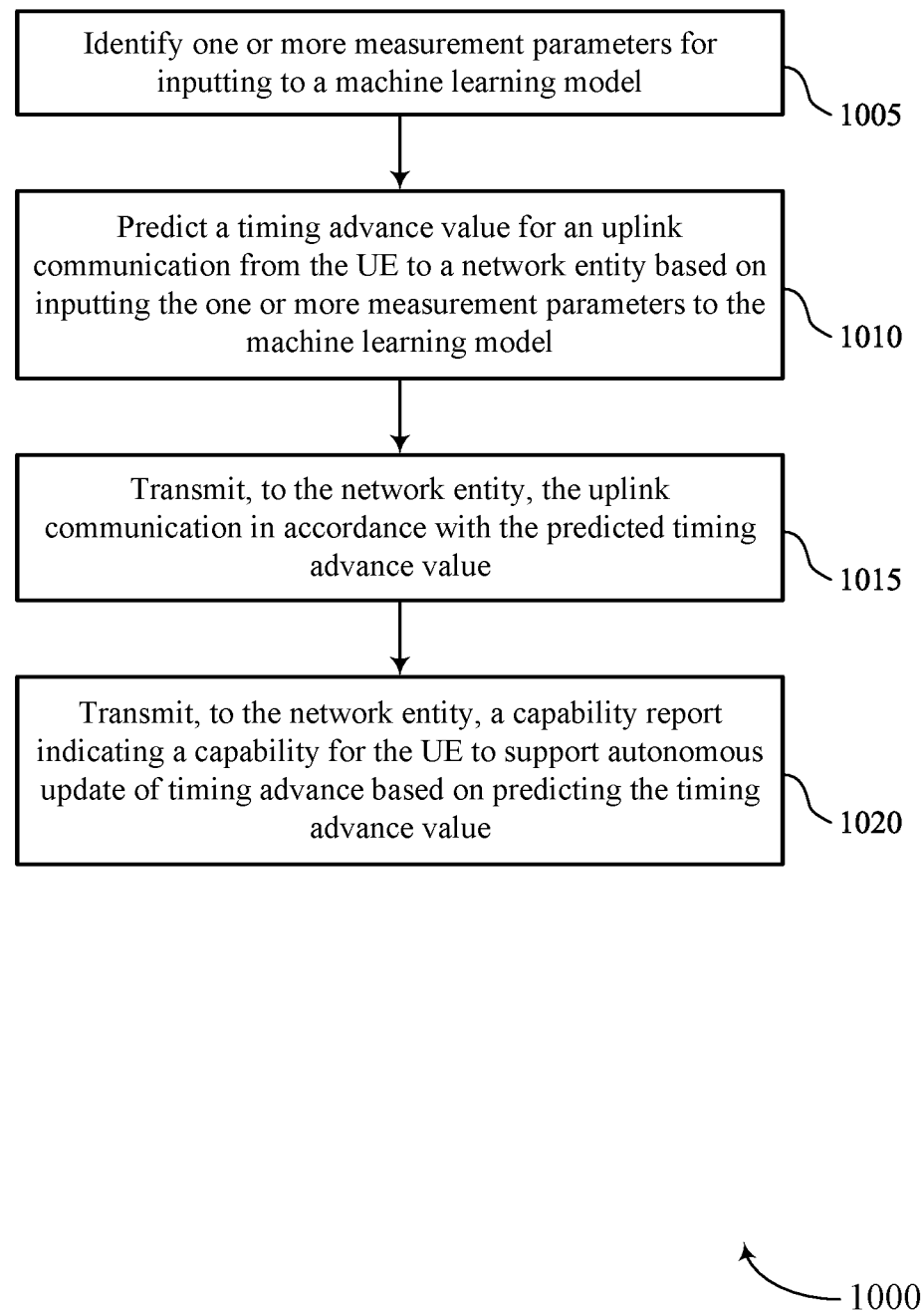

FIG. 10 shows a flowchart illustrating a method 1000 that supports ML based TA updates in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include identifying one or more measurement parameters for inputting to a ML model. The operations of 1005 may be performed in accordance with examples as disclosed herein. In some examples, aspects of the operations of 1005 may be performed by a measurement parameter component 725 as described with reference to FIG. 7.

At 1010, the method may include predicting a TA value for an uplink communication from the UE to a network entity based on inputting the one or more measurement parameters to the ML model. The operations of 1010 may be performed in accordance with examples as disclosed herein. In some examples, aspects of the operations of 1010 may be performed by a TA value component 730 as described with reference to FIG. 7.

At 1015, the method may include transmitting, to the network entity, the uplink communication in accordance with the predicted TA value. The operations of 1015 may be performed in accordance with examples as disclosed herein. In some examples, aspects of the operations of 1015 may be performed by an uplink communication component 735 as described with reference to FIG. 7.

At 1020, the method may include transmitting, to the network entity, a capability report indicating a capability for the UE to support autonomous update of TA based on predicting the TA value. The operations of 1020 may be performed in accordance with examples as disclosed herein. In some examples, aspects of the operations of 1020 may be performed by a capability report component 740 as described with reference to FIG. 7.

Figure 11:
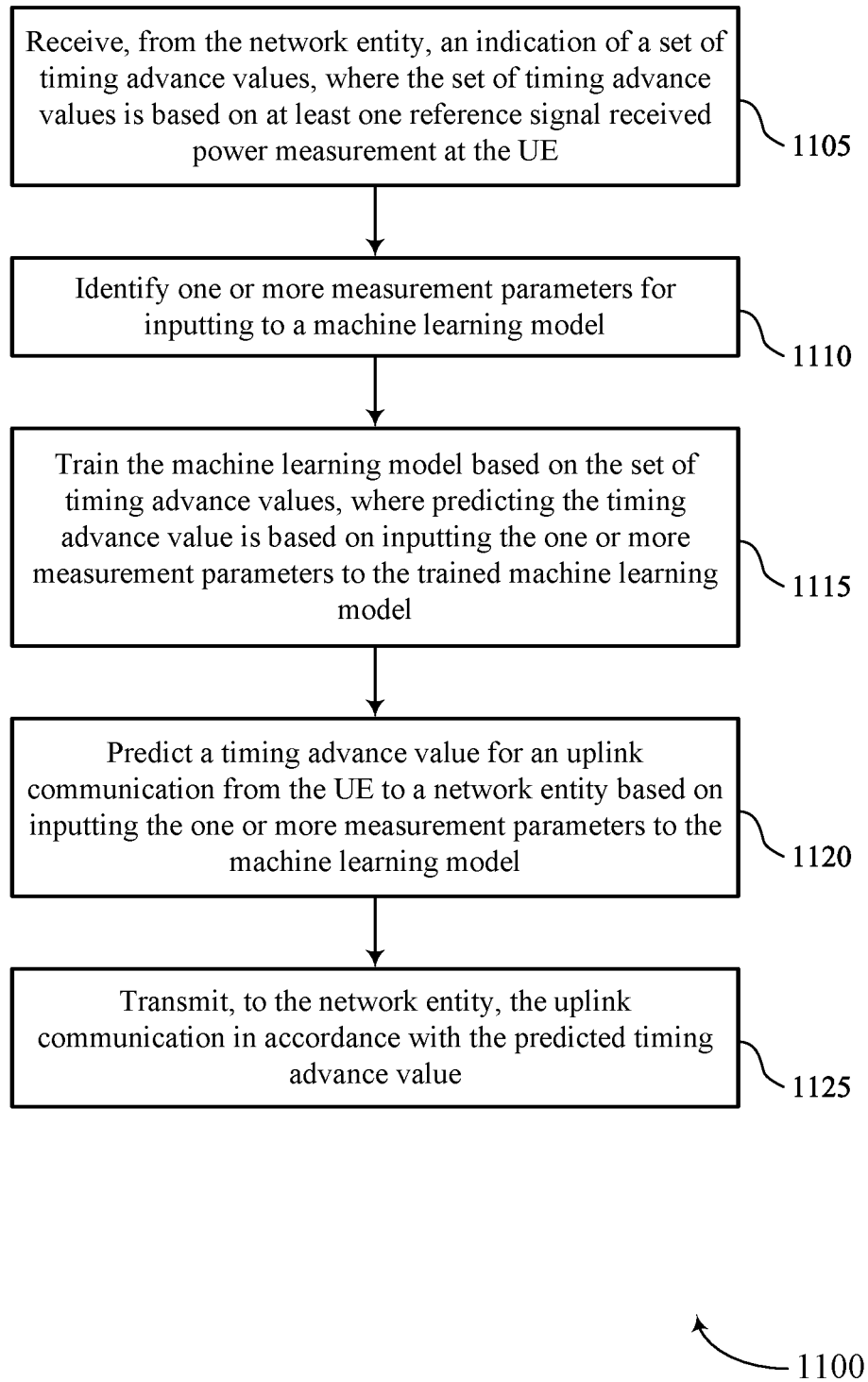

FIG. 11 shows a flowchart illustrating a method 1100 that supports ML based TA updates in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, from the network entity, an indication of a set of TA values, where the set of TA values is based on at least one reference signal received power measurement at the UE. The operations of 1105 may be performed in accordance with examples as disclosed herein. In some examples, aspects of the operations of 1105 may be performed by a TA value component 730 as described with reference to FIG. 7.

At 1110, the method may include identifying one or more measurement parameters for inputting to a ML model. The operations of 1110 may be performed in accordance with examples as disclosed herein. In some examples, aspects of the operations of 1110 may be performed by a measurement parameter component 725 as described with reference to FIG. 7.

At 1115, the method may include training the ML model based on the set of TA values, where predicting the TA value is based on inputting the one or more measurement parameters to the trained ML model. The operations of 1115 may be performed in accordance with examples as disclosed herein. In some examples, aspects of the operations of 1115 may be performed by an ML training component 745 as described with reference to FIG. 7.

At 1120, the method may include predicting a TA value for an uplink communication from the UE to a network entity based on inputting the one or more measurement parameters to the ML model. The operations of 1120 may be performed in accordance with examples as disclosed herein. In some examples, aspects of the operations of 1120 may be performed by a TA value component 730 as described with reference to FIG. 7.

At 1125, the method may include transmitting, to the network entity, the uplink communication in accordance with the predicted TA value. The operations of 1125 may be performed in accordance with examples as disclosed herein. In some examples, aspects of the operations of 1125 may be performed by an uplink communication component 735 as described with reference to FIG. 7.

The following provides an overview of aspects of the present disclosure:

Aspect 1: A method for wireless communication at a UE, comprising: identifying one or more measurement parameters for inputting to a ML model; predicting a TA value for an uplink communication from the UE to a network entity based at least in part on inputting the one or more measurement parameters to the ML model; and transmitting, to the network entity, the uplink communication in accordance with the predicted TA value.

Aspect 2: The method of aspect 1, further comprising: transmitting, to the network entity, a capability report indicating a capability for the UE to support autonomous update of TA based at least in part on predicting the TA value.

Aspect 3: The method of aspect 2, wherein the capability report further indicates the capability for the UE to support at least one of a TA group module type, a quantity of TA groups for the autonomous update of TA, a type of input for TA prediction, or a combination thereof.

Aspect 4: The method of any of aspects 1 through 3, further comprising: receiving, from the network entity, an indication of a set of TA values, wherein the set of TA values is based at least in part on at least one reference signal received power measurement at the UE; and training the ML model based at least in part on the set of TA values, wherein predicting the TA value is based at least in part on inputting the one or more measurement parameters to the trained ML model.

Aspect 5: The method of any of aspects 1 through 4, wherein identifying the one or more measurement parameters further comprises: measuring one or more reference signal received power values associated with one or more channel state reference signals, wherein predicting the TA value is based at least in part on inputting the one or more one or more reference signal received power values to the ML model.

Aspect 6: The method of any of aspects 1 through 5, further comprising: determining that the predicted TA value corresponds to an output port associated with the ML model.

Aspect 7: The method of aspect 6, further comprising: identifying a mapping between a cell identifier and the output port associated with the ML model, wherein transmitting the uplink communication comprises transmitting the uplink communication associated with the cell identifier in accordance with the predicted TA value.

Aspect 8: The method of any of aspects 6 through 7, further comprising: identifying a mapping between a TA group identifier and the output port associated with the ML model, wherein transmitting the uplink communication comprises transmitting the uplink communication associated with the TA group identifier in accordance with the predicted TA value.

Aspect 9: The method of any of aspects 1 through 8, further comprising: receiving, from the network entity, a request to pause predicting a future TA value for a second uplink communication; and refraining from predicting the future TA value for the second uplink communication based at least in part on receiving the request.

Aspect 10: The method of any of aspects 1 through 9, further comprising: receiving, from the network entity, a request for the one or more measurement parameters inputted to the ML model; and transmitting, to the network entity, an indication of the one or more measurement parameters in response to the request.

Aspect 11: The method of any of aspects 1 through 10, further comprising: transmitting, to the network entity, a random access signal or a sounding reference signal or both; and receiving, from the network entity, an indication of a second TA value based at least in part on transmitting the random access signal or the sounding reference signal or both.

Aspect 12: The method of any of aspects 1 through 11, further comprising: receiving, from the network entity, a request to update the ML model; and updating the ML model based at least in part on the request, wherein predicting the TA value is based at least in part on inputting the one or more measurement parameters to the updated ML model.

Aspect 13: The method of any of aspects 1 through 12, wherein transmitting the uplink communication further comprises: transmitting, to the network entity, the uplink communication at a first time instance in accordance with the predicted TA value, wherein the one or more measurement parameters comprise a set of TA values corresponding to a set of time instances prior to the first time instance.

Aspect 14: The method of any of aspects 1 through 13, further comprising: the one or more measurement parameters comprise at least one TA value associated with a second network entity.

Aspect 15: The method of any of aspects 1 through 14, wherein the one or more measurement parameters comprise at least one of a reference signal received power, a power delay profile associated with one or more beams, a power delay profile associated with the network entity, a power delay profile associated with one or more transmission and reception points, a TA value for a communication link, a location of the UE, a positioning signaling information associated with radio frequency sensing, the positioning signaling information associated with a camera, the positioning signaling information associated with a radar at the UE, a transmission configuration indicator identifier, or a combination thereof.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the UE to:
      transmit an indication of a capability of the UE to predict timing advance values;
      measure one or more reference signal received power values corresponding to one or more channel state reference signals, the one or more reference signal received power values comprising at least a portion of one or more measurement parameters to input into a machine learning model;
      predict a timing advance value for an uplink communication from the UE in accordance with the indicated capability based at least in part on inputting the one or more measurement parameters into the machine learning model; and
      transmit the uplink communication in accordance with the predicted timing advance value.

2. The apparatus of claim 1, wherein the indication of the capability of the UE to predict timing advance values is included in a UE capability report.

3. The apparatus of claim 1, wherein the indication of the capability of the UE to predict timing advance values indicates a capability for the UE to support at least one of a timing advance group module type, a quantity of timing advance groups for autonomous update of timing advance, a type of input for timing advance prediction, or a combination thereof.

4. The apparatus of claim 1, wherein the instructions are further executable by the one or more processors to cause the UE to:
   receive an indication of a set of timing advance values, wherein the set of timing advance values is based at least in part on at least one reference signal received power measurement at the UE; and
   train the machine learning model based at least in part on the set of timing advance values, wherein predicting the timing advance value is based at least in part on inputting the one or more measurement parameters to the trained machine learning model.

5. The apparatus of claim 1, wherein the predicted timing advance value corresponds to an output port associated with the machine learning model.

6. The apparatus of claim 5, wherein the instructions are further executable by the one or more processors to cause the UE to:
   identify a mapping between a cell identifier and the output port associated with the machine learning model, wherein transmitting the uplink communication comprises transmitting the uplink communication associated with the cell identifier in accordance with the predicted timing advance value.

7. The apparatus of claim 5, wherein the instructions are further executable by the one or more processors to cause the UE to:
   identify a mapping between a timing advance group identifier and the output port associated with the machine learning model, wherein transmitting the uplink communication comprises transmitting the uplink communication associated with the timing advance group identifier in accordance with the predicted timing advance value.

8. The apparatus of claim 1, wherein the instructions are further executable by the one or more processors to cause the UE to:
   receive a request to pause predicting a future timing advance value for a second uplink communication; and
   refrain from predicting the future timing advance value for the second uplink communication based at least in part on receiving the request.

9. The apparatus of claim 1, wherein the instructions are further executable by the one or more processors to cause the UE to:
   receive a request for the one or more measurement parameters inputted to input into the machine learning model; and
   transmit an indication of the one or more measurement parameters in response to the request.

10. The apparatus of claim 1, wherein the instructions are further executable by the one or more processors to cause the UE to:
    transmit a random access signal or a sounding reference signal or both; and
    receive an indication of a second timing advance value based at least in part on transmitting the random access signal or the sounding reference signal or both.

11. The apparatus of claim 1, wherein the instructions are further executable by the one or more processors to cause the UE to:
    receive a request to update the machine learning model; and update the machine learning model based at least in part on the request, wherein predicting the timing advance value is based at least in part on inputting the one or more measurement parameters into the updated machine learning model.

12. The apparatus of claim 1, wherein the instructions to transmit the uplink communication are further executable by the one or more processors to cause the UE to:
transmit the uplink communication at a first time instance in accordance with the predicted timing advance value, wherein the one or more measurement parameters comprise a set of timing advance values corresponding to a set of time instances prior to the first time instance.

13. The apparatus of claim 1, wherein the predicted timing advance value is for communication between the UE and a first network entity, and the one or more measurement parameters comprise at least one timing advance value for communication with a second network entity.

14. The apparatus of claim 1, wherein the one or more measurement parameters comprise at least one of a reference signal received power, a power delay profile associated with one or more beams, a power delay profile of a network entity, a power delay profile associated with one or more transmission and reception points, a timing advance value for a communication link, a location of the UE, a positioning signaling information associated with radio frequency sensing, the positioning signaling information associated with a camera, the positioning signaling information associated with a radar at the UE, a transmission configuration indicator identifier, or a combination thereof.

15. A method for wireless communication at a user equipment (UE), comprising:
transmitting an indication of a capability of the UE to predict timing advance values;
measuring one or more reference signal received power values corresponding to one or more channel state reference signals, the one or more reference signal received power values comprising at least a portion of one or more measurement parameters to input into a machine learning model;
predicting a timing advance value for an uplink communication from the UE in accordance with the indicated capability based at least in part on inputting the one or more measurement parameters into the machine learning model; and
transmitting the uplink communication in accordance with the predicted timing advance value.

16. The method of claim 15,
wherein the indication of the capability of the UE to predict timing advance values is indicated in a UE capability report.

17. The method of claim 15, wherein the indication of the capability of the UE to predict timing advance values indicates a capability for the UE to support at least one of a timing advance group module type, a quantity of timing advance groups for autonomous update of timing advance, a type of input for timing advance prediction, or a combination thereof.

18. The method of claim 15, further comprising:
receiving an indication of a set of timing advance values, wherein the set of timing advance values is based at least in part on at least one reference signal received power measurement at the UE; and
training the machine learning model based at least in part on the set of timing advance values, wherein predicting the timing advance value is based at least in part on inputting the one or more measurement parameters to the trained machine learning model.

19. The method of claim 15,
wherein the predicted timing advance value corresponds to an output port associated with the machine learning model.

20. The method of claim 19, further comprising:
identifying a mapping between a cell identifier and the output port associated with the machine learning model, wherein transmitting the uplink communication comprises transmitting the uplink communication associated with the cell identifier in accordance with the predicted timing advance value.

21. The method of claim 19, further comprising:
identifying a mapping between a timing advance group identifier and the output port associated with the machine learning model, wherein transmitting the uplink communication comprises transmitting the uplink communication associated with the timing advance group identifier in accordance with the predicted timing advance value.

22. The method of claim 15, further comprising:
receiving a request to pause predicting a future timing advance value for a second uplink communication; and
refraining from predicting the future timing advance value for the second uplink communication based at least in part on receiving the request.

23. The method of claim 15, further comprising:
receiving a request for the one or more measurement parameters to input into the machine learning model; and
transmitting an indication of the one or more measurement parameters in response to the request.

24. The method of claim 15, further comprising:
transmitting a random access signal or a sounding reference signal or both; and
receiving an indication of a second timing advance value based at least in part on transmitting the random access signal or the sounding reference signal or both.

25. The method of claim 15, further comprising:
receiving a request to update the machine learning model; and
updating the machine learning model based at least in part on the request, wherein predicting the timing advance value is based at least in part on inputting the one or more measurement parameters into the updated machine learning model.

26. The method of claim 15, wherein transmitting the uplink communication further comprises:
transmitting the uplink communication at a first time instance in accordance with the predicted timing advance value, wherein the one or more measurement parameters comprise a set of timing advance values corresponding to a set of time instances prior to the first time instance.

27. An apparatus for wireless communication at a user equipment (UE), comprising:
means for transmitting an indication of a capability of the UE to predict timing advance values;
means for measuring one or more reference signal received power values corresponding to one or more channel state reference signals, the one or more reference signal received power values comprising at least a portion of one or more measurement parameters to input into a machine learning model;
means for predicting a timing advance value for an uplink communication from the UE in accordance with the indicated capability based at least in part on inputting the one or more measurement parameters into the machine learning model; and means for transmitting the uplink communication in accordance with the predicted timing advance value.

28. A non-transitory computer-readable medium storing code for wireless communication at a user equipment (UE), the code comprising instructions executable by one or more processors to:

transmit an indication of a capability of the UE to predict timing advance values;

measure one or more reference signal received power values corresponding to one or more channel state reference signals, the one or more reference signal received power values comprising at least a portion of one or more measurement parameters to input into a machine learning model;

predict a timing advance value for an uplink communication from the UE in accordance with the indicated capability based at least in part on inputting the one or more measurement parameters into the machine learning model; and transmit the uplink communication in accordance with the predicted timing advance value.

* * * * *